US011372129B2

(12) United States Patent
Cai et al.

(10) Patent No.: US 11,372,129 B2
(45) Date of Patent: Jun. 28, 2022

(54) POST-COMPENSATION METHOD FOR MOTION ERRORS OF ROTATING ACCELEROMETER GRAVITY GRADIOMETER

(71) Applicant: SOUTHEAST UNIVERSITY, Nanjing (CN)

(72) Inventors: Tijing Cai, Nanjing (CN); Mingbiao Yu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/418,848

(22) PCT Filed: May 30, 2019

(86) PCT No.: PCT/CN2019/089238
§ 371 (c)(1),
(2) Date: Jun. 28, 2021

(87) PCT Pub. No.: WO2020/140378
PCT Pub. Date: Jul. 9, 2020

(65) Prior Publication Data
US 2022/0075091 A1    Mar. 10, 2022

(30) Foreign Application Priority Data
Dec. 31, 2018    (CN) .......................... 201811651176.8

(51) Int. Cl.
*G01V 7/06* (2006.01)
*G01P 15/18* (2013.01)

(52) U.S. Cl.
CPC ................ *G01V 7/06* (2013.01); *G01P 15/18* (2013.01)

(58) Field of Classification Search
CPC . G01P 3/00; G01P 15/18; G01P 21/00; G01V 7/06
See application file for complete search history.

(56) References Cited

U.S. PATENT DOCUMENTS

| 6,658,935 B1 | 12/2003 | Feinberg |
| 2006/0156810 A1* | 7/2006 | Brett ........................ G01V 7/00 73/1.37 |

FOREIGN PATENT DOCUMENTS

| CN | 104374401 A | 2/2015 |
| CN | 108873093 A | 11/2018 |

(Continued)

OTHER PUBLICATIONS

Shu-Fu Wang, et al., Study on Scale Factor Adjusting and Error Compensation for Rotating Accelerometer Gravity Gradiometer, Journal of Chinese Inertial Technology, 2000, pp. 31-34,45, vol. 8 No. 4.

(Continued)

*Primary Examiner* — Catherine T. Rastovski
(74) *Attorney, Agent, or Firm* — Bayramoglu Law Offices LLC (57) ABSTRACT

A post-compensation method for motion errors of a rotating accelerometer gravity gradiometer includes the steps of: during moving-base gravity gradient exploration, recording angular and linear motions of a gravity gradiometer; after the exploration, removing angular and linear motion errors from output data of the gravity gradiometer based on an analytical model of the rotating accelerometer gravity gradiometer; while ensuring that the precision of the gravity gradiometer is unchanged, the post-compensation method for the motion errors may be applied to greatly reduce the requirements of the gravity gradiometer for the precision of an online error compensation system, thereby simplifying the circuit design and mechanical design of the rotary (Continued)

accelerometer gravity gradiometer, and making the rotating accelerometer gravity gradiometer simpler and cheaper.

3 Claims, 4 Drawing Sheets

(56) References Cited

FOREIGN PATENT DOCUMENTS

| | | |
|---|---|---|
| CN | 108931824 A | 12/2018 |
| CN | 109766812 A | 5/2019 |

OTHER PUBLICATIONS

Qian Xuewu, et al., Data processing method for rotating accelerometer gravity gradiometer, Journal of Southeast University (Natural Science Edition), 2016, pp. 708-712, vol. 46 No. 4.

\* cited by examiner

POST-COMPENSATION METHOD FOR MOTION ERRORS OF ROTATING ACCELEROMETER GRAVITY GRADIOMETER

CROSS REFERENCE TO THE RELATED APPLICATIONS

This application is the national phase entry of International Application No. PCT/CN2019/089238, filed on May 30, 2019, which is based upon and claims priority to Chinese Patent Application No. 201811651176.8, filed on Dec. 31, 2018, the entire contents of which are incorporated herein by reference.

TECHNICAL FIELD

The present invention relates to a post-compensation method for motion errors of a rotating accelerometer gravity gradiometer, belonging to the field of a precision measurement technology.

BACKGROUND

Moving-base gravity gradient exploration is a gravity gradient exploration method with a low cost and a high efficiency, and is the existing most advanced gravity field exploration method in the world. Gravity gradient data has been extensively applied to geological analysis, gravity field modeling, high-precision navigation and resource exploration. The gravity gradiometer is extremely important for national defense and civil use. The existing gravity gradiometers under study in the domestic and overseas mainly include cold atom gravity gradiometer, superconducting gravity gradiometer and MEMS gravity gradiometer. The gravity gradiometers, which have been put into commercial application overseas, mainly include rotating accelerometer gravity gradiometer and superconducting accelerometer gravity gradiometer. A gravity gradiometer model is being developed in China.

During the moving-base gravity gradient exploration, the acceleration, angular velocity and angular acceleration thereof are output to the gravity gradiometer to cause a measurement error due to installation error, and mismatching of first-order and high-order scale factors as well as a circuit gain of an accelerometer within the gravity gradiometer. With respect to the online error compensation of the rotating accelerometer gravity gradiometer, a compensation circuit and a mechanical design thereof are complicated. Moreover, the gravity gradiometer can only restrain the linear and angular motion errors of the gravity gradiometer to a certain degree, and the remaining linear and angular motion errors of the gravity gradiometer severely affect the measurement precision of the gravity gradiometer, so that the error post-compensation is required. No post-compensation method for the motion errors of the rotating accelerometer gravity gradiometer has been reported publicly so far.

SUMMARY

The present invention provides a post-compensation method for motion errors of a rotating accelerometer gravity gradiometer. According to the method, motion error coefficients of the gravity gradiometer may be calibrated rapidly, and errors caused by the linear and angular motions thereof may be removed based on an analytical model of the rotating accelerometer gravity gradiometer. Under the condition of ensuring that the resolution of the gravity gradiometer remains unchanged, the method for the post-compensation may greatly reduce the requirements of the gravity gradiometer for the precision of an online error compensation system, thereby simplifying the design of the online error compensation system as well as the circuit design and mechanical design of the rotary accelerometer gravity gradiometer. Meanwhile, the present invention provides the post-compensation method for the motion errors of the rotating accelerometer gravity gradiometer which has the above effects and solves the above problems.

Technical Solution

The post-compensation method for the motion errors of the rotating accelerometer gravity gradiometer comprises the following steps:

(1) preprocessing output data, linear motion data and angular motion data of the rotating accelerometer gravity gradiometer based on the following formula;

filtering the output data, the linear motion data and the angular motion data of the rotating accelerometer gravity gradiometer, converting a sampling rate, reducing data noise, and also making the same the sampling rates of the output data, the linear motion data and the angular motion data of the rotating accelerometer gravity gradiometer; and dividing the output data, the linear motion data and the angular motion data of the rotating accelerometer gravity gradiometer with a total exploration time length of L hours into N data blocks by time, wherein the time lengths of the data blocks may be different;

(2) removing linear and angular motion errors from N data blocks sequentially, wherein methods for removing the linear and angular motion errors from the data blocks are the same, and a step of removing the linear and angular motion errors from each data block comprises the following processes:

a. calculating linear motion vectors and angular motion vectors that are of the data block at all times based on the following formula:

$$L_m(t) = \begin{bmatrix} a_x(t)a_y(t)\sin 2\Omega t + 0.5(a_x^2(t) - a_y^2(t))\cos 2\Omega t \\ a_x(t)a_y(t)\cos 2\Omega t - 0.5(a_x^2(t) - a_y^2(t))\sin 2\Omega t \\ a_x(t)\sin\Omega t - a_y(t)\cos\Omega t \\ a_y(t)\sin\Omega t + a_x(t)\cos\Omega t \\ a_x(t)a_z(t)\sin\Omega t - a_y(t)a_z(t)\cos\Omega t \\ a_y(t)a_z(t)\sin\Omega t + a_x(t)a_z(t)\cos\Omega t \\ 0.5(a_x^2(t) + a_y^2(t)) \\ a_z^2(t) \\ a_z(t) \\ 1 \end{bmatrix},$$

-continued $$L_a(t) = \begin{bmatrix} -0.5(\omega_x^2(t) - \omega_y^2(t))\sin 2\Omega t + \omega_x(t)\omega_y(t)\cos 2\Omega t \\ \omega_x(t)\omega_y(t)\sin 2\Omega t + 0.5(\omega_x^2(t) - \omega_y^2(t))\cos 2\Omega t \\ \omega_x(t)\omega_z(t)\sin\Omega t - \omega_y(t)\omega_z(t)\cos\Omega t \\ \omega_y(t)\omega_z(t)\sin\Omega t + \omega_x(t)\omega_z(t)\cos\Omega t \\ \omega_{ax}(t)\sin\Omega t - \omega_{ay}(t)\cos\Omega t \\ \omega_{ay}(t)\sin\Omega t + \omega_{ax}(t)\cos\Omega t \\ \omega_{az}(t) \\ 0.5(\omega_x^2(t) + \omega_y^2(t) + 2\omega_z^2(t)) \end{bmatrix}$$

where, t represents the time of the data block; $L_m(t)$ represents a linear motion vector at the time t of the data block; $L_a(t)$ represents an angular motion vector at the time t of the data block; $a_x(t)$, $a_y(t)$, $a_z(t)$ represents a linear motion data at the time t of the data block; $\omega_x(t)$, $\omega_y(t)$, $\omega_z(t)$, $\omega_{ax}(t)$, $\omega_{ay}(t)$ and $\omega_{az}(t)$ represent angular motion data at the time t of the data block, and $\Omega$ represents an angular frequency of a rotating disc of the rotating accelerometer gravity gradiometer;

b. substituting the linear motion vectors and the angular motion vectors that are of the data block at all times into the following formula to calculate a motion matrix L of the data block:

$$L = \begin{bmatrix} L_m(t_1), \dots, L_m(t), \dots L_m(t_p) \\ L_a(t_1), \dots, L_a(t), \dots L_a(t_p) \end{bmatrix}$$

where, $t_1$ represents start time of the data block; $L_m(t_1)$ represents a linear motion vector at the start time $t_1$ of the data block; and $L_a(t_1)$ represents an angular motion vector at the start time $t_1$ of the data block; $L_m(t)$ represents a linear motion vector at the time t of the data block; and $L_a(t)$ represents an angular motion vector at the time t of the data block; $t_p$ represents end time of the data block; $L_m(t_p)$ represents a linear motion vector at the end time $t_p$ of the data block; and $L_a(t_p)$ represents an angular motion vector at the end time $t_p$ of the data block;

c. Calibrating a linear motion error coefficient vector $C_m$ and an angular motion error coefficient vector $C_A$ of the data block based on the following formula, wherein $C_m$ is 1×10 vectors, and $C_A$ is 1×8 vectors:

$$[C_m, C_A] = G_{out} \cdot L^+$$

where, $G_{out}$ represents the output data block of the rotating accelerometer gravity gradiometer and $L^+$ represents a generalized inverse of an L matrix;

d. substituting the calibrated linear motion error coefficient vector $C_m$ and angular motion error coefficient vector $C_A$ into the following formula, and removing the linear and angular motion errors of the gravity gradiometer;

$$G_{out}^{gra} = G_{out} - [C_m, C_A]L$$

$G_{out}^{gra}$ represents the output data block of the rotating accelerometer gravity gradiometer after the linear and angular motion errors are removed, wherein L is a motion matrix of the data block calculated in the step b; and (3) combining and then demodulating N data blocks after the linear and angular motion errors are removed so as to output a gravitational gradient with an exploration time length of L hours.

Compared with the prior art, the present invention has the following advantages:

The present invention provides the post-compensation method for the motion errors of the rotating accelerometer gravity gradiometer for the first time. The present invention provides the post-compensation method for the linear and angular motion errors of the rotating accelerometer gravity gradiometer. The method includes the steps of, recording linear and angular motions of the gravity gradiometer during the gravity gradient exploration, and then removing linear and angular motion errors from output data of the gravity gradiometer upon the gravity gradient exploration. According to the data post-processing method, based on the high-precision analytical model of the gravity gradiometer, the linear and angular motion errors of the gravity gradiometer may be removed from raw data of the gravity gradiometer with an ultralow signal-to-noise ratio, and a gravitational gradient signal may be extracted; furthermore, the requirements of the gravity gradiometer for the precision of the online error compensation system may be greatly reduced, and the circuit design and the mechanical design of the gravity gradiometer may be simplified, and meanwhile, the gravity gradiometer may be applicable to the more severe dynamic environment.

DETAILED DESCRIPTION OF THE EMBODIMENTS

The present invention will be further depicted in combination with the embodiments and the drawings.

Figure 1:
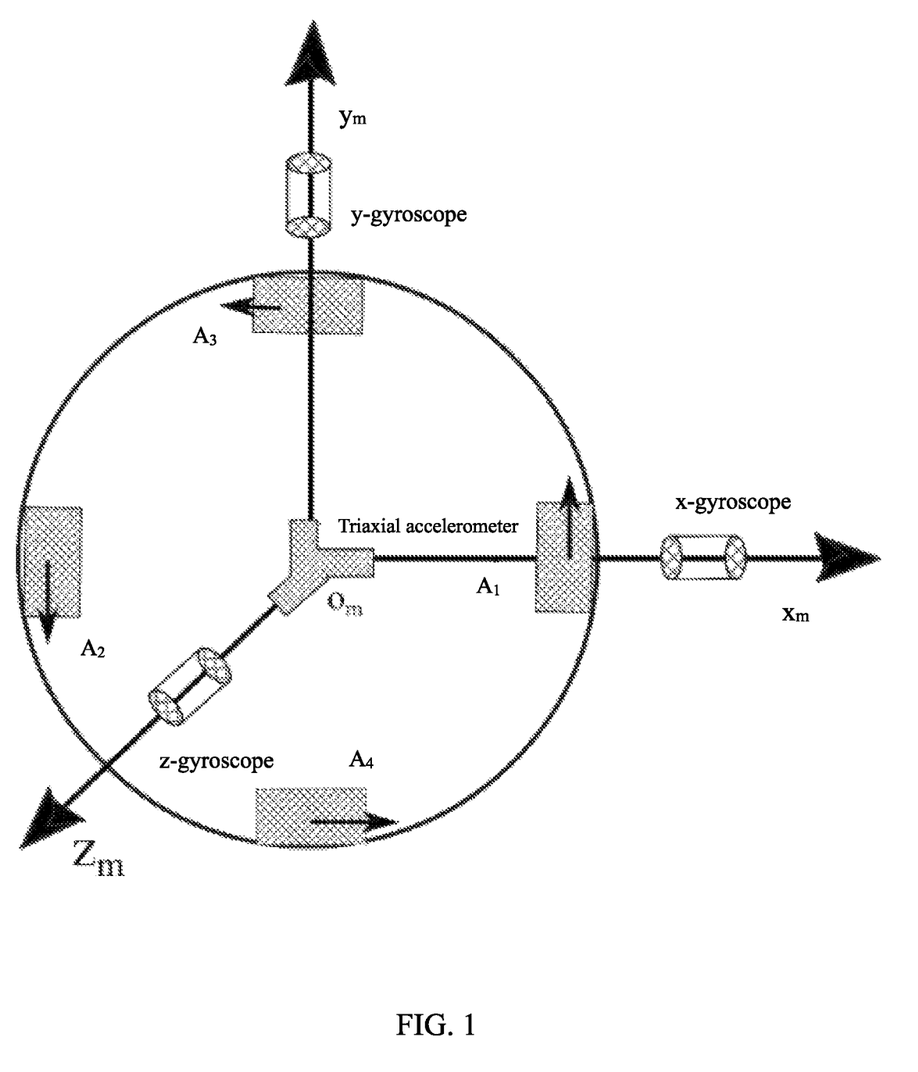
FIG. 1 is an installation diagram of a sensor for angular and linear motions of a gravity gradiometer.

As shown in FIG. 1, A1, A2, A3 and A4 are four accelerometers disposed on a rotating accelerometer gravity gradiometer and sensitive elements for a gravitational gradient; the origin of a measurement coordinate system of the gravity gradiometer is located in the center of a disc, $x_m$ is an X axis of the measurement coordinate system of the gravity gradiometer, $y_m$ is a Y axis of the measurement coordinate system of the gravity gradiometer, and $z_m$ is a Z axis of the measurement coordinate system of the gravity gradiometer; a triaxial accelerometer is disposed at a central point of a rotating disc of the gravity gradiometer, and is used for recording linear motions of the gravity gradiometer in the gravity gradient exploration; and gyroscopes are disposed on three coordinate axes of the measurement coordinate system of the gravity gradiometer, so as to record angular motions (angular velocity and angular acceleration) of the gravity gradiometer in the gravity gradient exploration.

Figure 2:
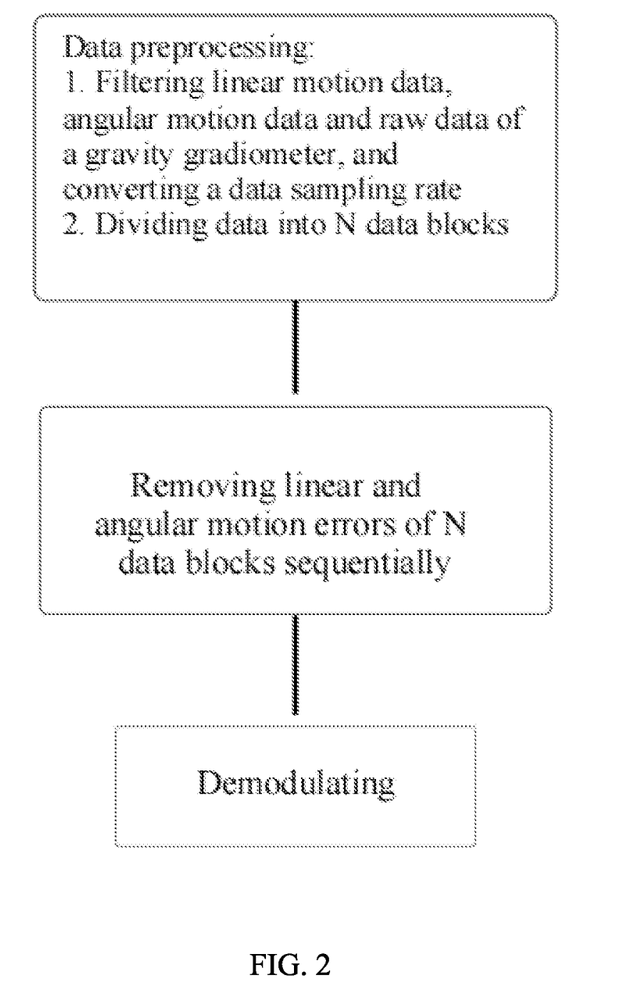
FIG. 2 is a flow diagram of post-compensation for motion errors.

As shown in FIG. 2, a post-compensation method for motion errors of a rotating accelerometer gravity gradiometer, including the following steps:

preprocessing output data, linear motion data and angular motion data of the rotating accelerometer gravity gradiometer: mainly including filtering, reducing data noise, and converting a sampling rate, and making the sampling rates of the output data, the linear motion data and the angular motion data of the rotating accelerometer gravity gradiometer the same, wherein the time length of airborne gravity gradient exploration may reach up to 7-8 hours, and during the exploration, linear and angular motion error coefficient vectors of the gravity gradiometer vary slowly as time goes by, but may be considered constant in a short period of time; and for the purpose of improving the precision of the error post-compensation, the output data, the linear motion data and the angular motion data of the gravity gradiometer may be divided into N data blocks by time according to the characteristics of the gravity gradiometer. For example, when the total time length of the airborne gravity gradient exploration is 8 hours, the output data, the linear motion data and the angular motion data of the gravity gradiometer may be divided into 8 continuous data blocks, and the time length of each block is 1 hour.

Removing linear and angular motion errors from 8 data blocks sequentially, wherein methods for removing the linear and angular motion errors from the data blocks are the same, and a step of removing the linear and angular motion errors from each data block comprises the following processes:

a. calculating linear motion vectors and angular motion vectors that are of the data block at all times based on the following formula:

$$L_m(t) = \begin{bmatrix} a_x(t)a_y(t)\sin 2\Omega t + 0.5(a_x^2(t) - a_y^2(t))\cos 2\Omega t \\ a_x(t)a_y(t)\cos 2\Omega t - 0.5(a_x^2(t) - a_y^2(t))\sin 2\Omega t \\ a_x(t)\sin\Omega t - a_y(t)\cos\Omega t \\ a_y(t)\sin\Omega t + a_x(t)\cos\Omega t \\ a_x(t)a_z(t)\sin\Omega t - a_y(t)a_z(t)\cos\Omega t \\ a_y(t)a_z(t)\sin\Omega t + a_x(t)a_z(t)\cos\Omega t \\ 0.5(a_x^2(t) + a_y^2(t)) \\ a_z^2(t) \\ a_z(t) \\ 1 \end{bmatrix},$$

$$L_a(t) = \begin{bmatrix} -0.5(\omega_x^2(t) - \omega_y^2(t))\sin 2\Omega t + \omega_x(t)\omega_y(t)\cos 2\Omega t \\ \omega_x(t)\omega_y(t)\sin 2\Omega t + 0.5(\omega_x^2(t) - \omega_y^2(t))\cos 2\Omega t \\ \omega_x(t)\omega_z(t)\sin\Omega t - \omega_y(t)\omega_z(t)\cos\Omega t \\ \omega_y(t)\omega_z(t)\sin\Omega t + \omega_x(t)\omega_z(t)\cos\Omega t \\ \omega_{ax}(t)\sin\Omega t - \omega_{ay}(t)\cos\Omega t \\ \omega_{ay}(t)\sin\Omega t + \omega_{ax}(t)\cos\Omega t \\ \omega_{az}(t) \\ 0.5(\omega_x^2(t) + \omega_y^2(t) + 2\omega_z^2(t)) \end{bmatrix}$$

where, t represents the time of the data block; $L_m(t)$ represents a linear motion vector at the time t of the data block; $L_a(t)$ represents an angular motion vector at the time t of the data block; $a_x(t)$, $a_y(t)$, $a_z(t)$ represents a linear motion data at the time t of the data block; $\omega_x(t)$, $\omega_y(t)$, $\omega_x(t)$, $\omega_{ax}(t)$, $\omega_{ay}(t)$ and $\omega_{az}(t)$ represent angular motion data at the time t of the data block, and c represents an angular frequency of a rotating disc of the rotating accelerometer gravity gradiometer;

b. substituting the linear motion vectors and the angular motion vectors that are of the data block at all times into the following formula to calculate a motion matrix L of the data block:

$$L = \begin{bmatrix} L_m(t_1), \ldots, L_m(t), \ldots L_m(t_p) \\ L_a(t_1), \ldots, L_a(t), \ldots L_a(t_p) \end{bmatrix}$$

where, $t_1$ represents start time of the data block; $L_m(t_1)$ represents a linear motion vector at the start time $t_1$ of the data block; and $L_a(t_1)$ represents an angular motion vector at the start time $t_1$ of the data block; $L_m(t)$ represents a linear motion vector at the time t of the data block; and $L_a(t)$ represents an angular motion vector at the time t of the data block; $t_p$ represents end time of the data block; $L_m(t_p)$ represents a linear motion vector at the end time $t_p$ of the data block; and $L_a(t_p)$ represents an angular motion vector at the end time $t_p$ of the data block;

c. Calibrating a linear motion error coefficient vector $C_m$ and an angular motion error coefficient vector $C_A$ of the data block based on the following formula, wherein $C_m$ is 1×10 vectors, and $C_A$ is 1×8 vectors:

$$[C_m, C_A] = G_{out} \cdot L^+$$

where, $G_{out}$ represents the output data block of the rotating accelerometer gravity gradiometer and $L^+$ represents a generalized inverse of an L matrix;

d. substituting the calibrated linear motion error coefficient vector $C_m$ and angular motion error coefficient vector $C_A$ into the following formula, and removing the linear and angular motion errors of the gravity gradiometer;

$$G_{out}{}^{gra} = G_{out} - [C_m, C_A]L$$

$G_{out}{}^{gra}$ represents the output data block of the rotating accelerometer gravity gradiometer after the linear and angular motion errors are removed, wherein L is a motion matrix of the data block calculated in the step b; and Combining and then demodulating 8 data blocks after the linear and angular motion errors are removed so as to output a gravitational gradient with an exploration time length of L hours.

Figure 3:
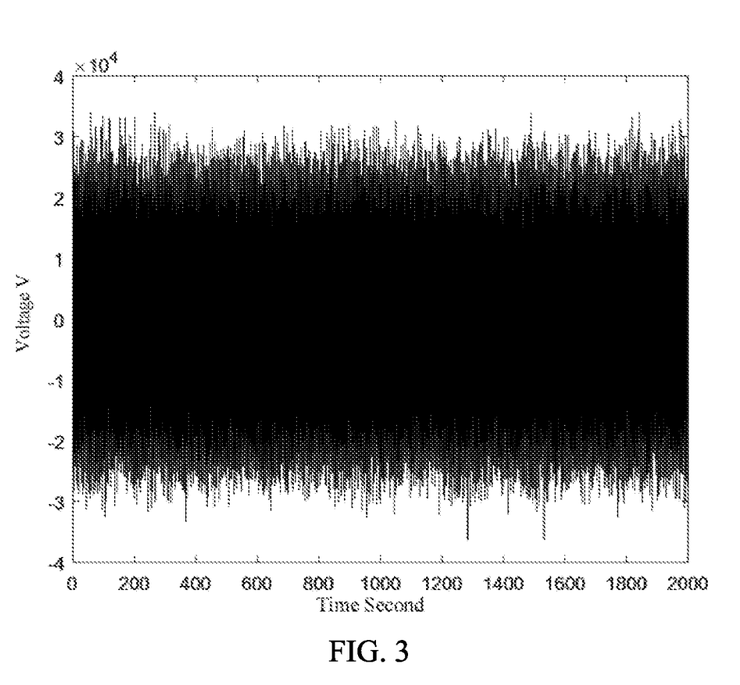
FIG. 3 is an original output graph of the rotating accelerometer gravity gradiometer.
Figure 4:
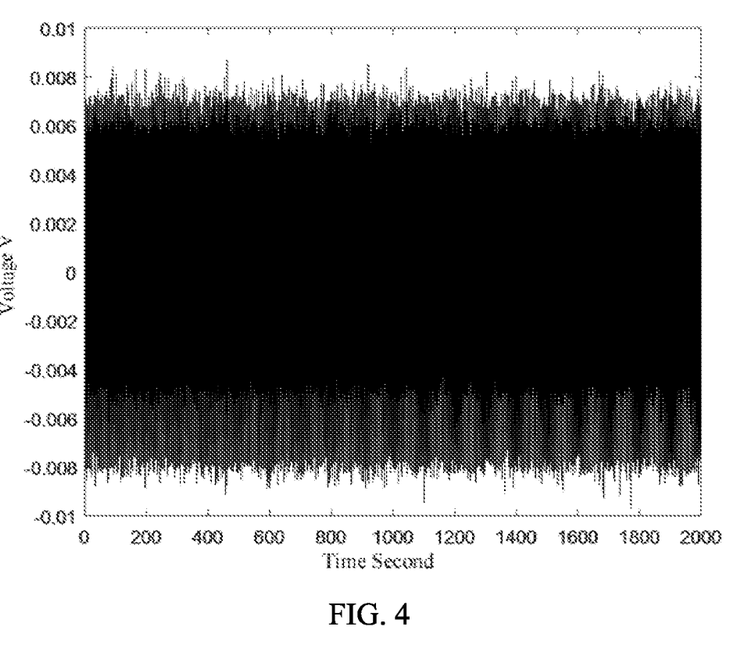
FIG. 4 is an output of the gravity gradiometer that eliminates the linear motion and angular motion errors of the gravity gradiometer, after the motion error compensation.
Figure 5:
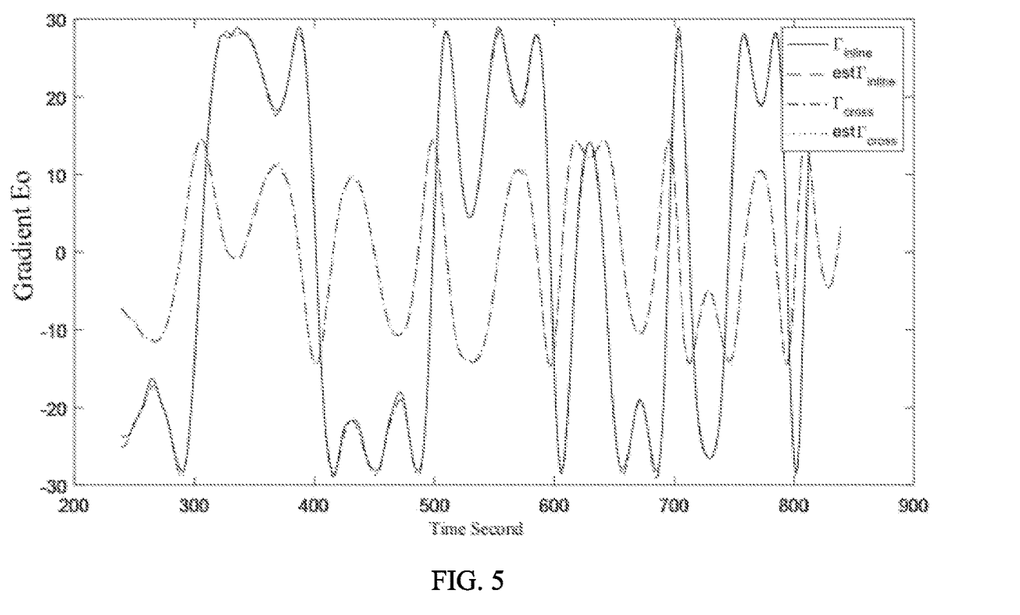
FIG. 5 is a comparison chart with the theoretical gravitational gradient, the gravitational gradient recovered by the output demodulation of the gravity gradiometer excluding the linear motion and angular motion of the gravity gradiometer.

To verify the solutions in the embodiments of the present invention, the following simulated analysis may be conducted:

as shown in FIG. 1, gyroscopes are disposed on the X, Y and Z axes of the measurement coordinate system of the gravity gradiometer to measure the angular motions of the gravity gradiometer; the triaxial accelerometer is disposed in the center of the rotating disc of the triaxial accelerometer to record the acceleration on the gravity gradiometer. The rotating accelerometer gravity gradiometer is disposed on a vibrating table, and then the vibrating table applies random linear and angular vibrations to the gravity gradiometer, and meanwhile, a test mass is applied to rotating around the gravity gradiometer to generate multi-frequency gravitational gradient signals to excite the gravity gradiometer, so as to simulate the airborne gravity gradient exploration; and a digital model of the rotating accelerometer gravity gradiometer is used for simulating the above process here. The radius of the disc of the simulated rotating accelerometer gravity gradiometer satisfies R=0.1 m, the rotation angle frequency of the disc satisfies Ω=1.57 rad/s, and a model parameter, an installation parameter and an amplifier circuit parameter of the gravity gradiometer of the rotating accelerometer gravity gradiometer are listed in the table below:

| Parameter | Accelerometer | | | |
|---|---|---|---|---|
| | Accelerometer 1 | Accelerometer 2 | Accelerometer 3 | Accelerometer 4 |
| Height error angle $\beta_{jx}$ (ar sec) | 21 | 14 | 17 | 19 |
| Initial phase error angle $\beta_z$ (ar sec) | 18 | 8 | 10 | 20 |
| Misalignment error angle $\theta_y$ (ar sec) | 21 | 10 | 7 | 19 |
| Misalignment error angle $\theta_z$ (ar sec) | 30 | 19 | 20 | 9 |
| Radial error $dR_j$ (um) | 0 | 30 | 35 | 25 |
| Linear scale factor $K_1$ (mA/g) | 10 | 11 | 11.5 | 12 |
| Second-order non-linear error coefficient $K_2$ (ug/g$^2$) | 5 | 1 | 8 | 7 |
| Second-order non-linear error coefficient $K_4$ (ug/g$^2$) | 6 | 12 | 5 | 16 |
| Second-order non-linear error coefficient $K_6$ (ug/g$^2$) | 4 | 11 | 9 | 13 |
| Second-order non-linear error coefficient $K_7$ (ug/g$^2$) | 5 | 15 | 7 | 17 |
| Second-order non-linear error coefficient $K_8$ (ug/g$^2$) | 0 | 7 | 11 | 20 |
| Amplifier circuit gain of the accelerometer (Ω) | $10^9$ | $10^9$ | $10^9$ | $10^9$ | when the test mass is 480 kg, an initial position of the measurement coordinate system of the gravity gradiometer is (1.5, 0, 0), and the rotational angular velocity around the gravity gradiometer is ω(t)=3600+360 sin (0.06280 deg/h. Linear vibration is applied to the gravity gradiometer to simulate a turbulence effect in the airborne exploration, the acceleration of the linear vibration follows Gaussian distribution, and the acceleration mean of the linear vibration in a vertical direction is 0.1 g, but a standard deviation is 0.02 g; an intensity of the linear vibration in a horizontal direction accounts for 15% the intensity in a vertical direction; and meanwhile, Gaussian angular vibration with the same intensity is applied to the three directions of the gravity gradiometer, an angular vibration mean is equal to 100 deg/h, and a standard deviation is equal to 50 deg/h. FIG. 3 shows a primary output of the rotating accelerometer gravity gradiometer, commonly excited by the linear motions, the angular motions and the gravitational gradient. FIG. 4 shows an output of the gravity gradiometer after post-compensation for the motion errors and removal of the linear and angular motion errors of the gravity gradiometer, only excited by the gravitational gradient. FIG. 5 shows the comparison between the gravitational gradient, which is output, demodulated and recovered by the gravity gradiometer after the linear and angular motions of the gravity gradiometer are removed, with the theoretical gravitational gradient; with respect to $\Gamma_{inline}$ in the figure, $\Gamma_{cross}$ is the theoretical gravitational gradient; with respect to est$\Gamma_{inline}$, est$\Gamma_{cross}$ is the gravitational gradient, which is output, demodulated and recovered by the gravity gradiometer after the linear and angular motions of the gravity gradiometer are removed. As can be seen from the figures, the recovered gravitational gradient is consistent with the theoretical gravitational gradient. In a simulation experiment, the magnitude of the turbulence applied to the gravity gradiometer is 200 mg, the magnitude of the angular velocity is $10^{-4}$-$10^{-3}$ rad/s, and the magnitude of the angular acceleration is $10^{-3}$-$10^{-2}$ rad/s$^2$; the magnitude of voltage input caused by the angular and linear motions of the gravity gradiometer is $10^{-5}$V, the magnitude of voltage output caused by the gravitational gradient is $10^{-2}$ V, and hence the magnitude of the signal-to-noise ratio is 10'. Under the condition that the noise is thousands or ten thousand times higher than the signal when the ultralow signal-to-noise ratio is $10^{-7}$, the post-compensation method for the errors provided by the present invention may eliminate the linear and angular motion errors of the gravity gradiometer, and the gravitational gradient may be recovered precisely. Simulation experiments show that the motion error post-compensation method provided by the present invention is excellent in performance.

Contents not elaborated in the Description of the present invention belong to the prior art known by those of skill in the art, and the foregoing embodiments are only the preferred implementations of the present invention. It should be noted that, for those of skill ordinary in the art, may make some improvements and equivalent replacements without departing from the principle of the present invention. These technical solutions which make improvements and equivalent replacements for the claims of the present invention fall into the protection scope of the present invention.

The invention claimed is:

1. A post-compensation method for motion errors of a rotating accelerometer gravity gradiometer, comprising the following steps of:
   processing output data from the rotating accelerometer gravity gradiometer;
   filtering output data, linear motion data and angular motion data of the rotating accelerometer gravity gradiometer
   converting the output data, the linear motion data, and the angular motion data to have a same sampling rate;
   reducing data noise of the output data, the linear motion data, and the angular motion data by:
   1) dividing the output data, the linear motion data, and the angular motion data of the rotating accelerometer gravity gradiometer with a total exploration time length of L hours into N data blocks by time, wherein time lengths of the N data blocks are different;
   2) removing linear and angular motion errors from the N data blocks sequentially;
   3) combining and then demodulating the N data blocks after the linear and angular motion errors are removed;
   4) outputting a gravitational gradient with the total exploration time length of L hours.

2. The post-compensation method for the motion errors of the rotating accelerometer gravity gradiometer according to claim 1, wherein the methods in step 2 for removing the linear and angular motion errors from the N data blocks are the same.

3. The post-compensation method for the motion errors of the rotating accelerometer gravity gradiometer according to claim 1, wherein in step 2, the step of removing the linear and angular motion errors from a data block of the N data blocks further comprises:

2-1) calculating linear motion vectors and angular motion vectors that are of the data block at all times based on the following formula:

$$L_m(t) = \begin{bmatrix} a_x(t)a_y(t)\sin 2\Omega t + 0.5(a_x^2(t) - a_y^2(t))\cos 2\Omega t \\ a_x(t)a_y(t)\cos 2\Omega t - 0.5(a_x^2(t) - a_y^2(t))\sin 2\Omega t \\ a_x(t)\sin\Omega t - a_y(t)\cos\Omega t \\ a_y(t)\sin\Omega t + a_x(t)\cos\Omega t \\ a_x(t)a_z(t)\sin\Omega t - a_y(t)a_z(t)\cos\Omega t \\ a_y(t)a_z(t)\sin\Omega t + a_x(t)a_z(t)\cos\Omega t \\ 0.5(a_x^2(t) + a_y^2(t)) \\ a_z^2(t) \\ a_z(t) \\ 1 \end{bmatrix},$$

$$L_a(t) = \begin{bmatrix} -0.5(\omega_x^2(t) - \omega_y^2(t))\sin 2\Omega t + \omega_x(t)\omega_y(t)\cos 2\Omega t \\ \omega_x(t)\omega_y(t)\sin 2\Omega t + 0.5(\omega_x^2(t) - \omega_y^2(t))\cos 2\Omega t \\ \omega_x(t)\omega_z(t)\sin\Omega t - \omega_y(t)\omega_z(t)\cos\Omega t \\ \omega_y(t)\omega_z(t)\sin\Omega t + \omega_x(t)\omega_z(t)\cos\Omega t \\ \omega_{ax}(t)\sin\Omega t - \omega_{ay}(t)\cos\Omega t \\ \omega_{ay}(t)\sin\Omega t + \omega_{ax}(t)\cos\Omega t \\ \omega_{az}(t) \\ 0.5(\omega_x^2(t) + \omega_y^2(t) + 2\omega_z^2(t)) \end{bmatrix}$$

where, t represents the time of the data block; $L_m(t)$ represents a linear motion vector at the time t of the data block; $L_a(t)$ represents an angular motion vector at the time t of the data block; $a_x(t)$, $a_y(t)$, $a_z(t)$ represents a linear motion data at the time t of the data block; $\omega_x(t)$, $\omega_y(t)$, $\omega_z(t)$, $\omega_{ax}(t)$, $\omega_{ay}(t)$ and $\omega_{az}(t)$ represent angular motion data at the time t of the data block, and $\Omega$ represents an angular frequency of a rotating disc of the rotating accelerometer gravity gradiometer;

2-2) substituting the linear motion vectors and the angular motion vectors that are of the data block at all times into the following formula to calculate a motion matrix L of the data block:

$$L = \begin{bmatrix} L_m(t_1), \ldots, L_m(t), \ldots L_m(t_p) \\ L_a(t_1), \ldots, L_a(t), \ldots L_a(t_p) \end{bmatrix}$$

where, $t_1$ represents a start time of the data block; $L_m(t_1)$ represents a linear motion vector at the start time $t_1$ of the data block; and $L_a(t_1)$ represents an angular motion vector at the start time $t_1$ of the data block; $L_m(t)$ represents a linear motion vector at the time t of the data block; and $L_a(t)$ represents an angular motion vector at the time t of the data block; $t_p$ represents an end time of the data block; $L_m(t_p)$ represents a linear motion vector at the end time $t_p$ of the data block; and $L_a(t_p)$ represents an angular motion vector at the end time $t_p$ of the data block;

2-3) calibrating a linear motion error coefficient vector $C_m$ and an angular motion error coefficient vector $C_A$ of the data block based on the following formula, wherein $C_m$ is 1×10 vectors, and $C_A$ is 1×8 vectors:

$$[C_m, C_A] = G_{out} \cdot L^+$$

where, $G_{out}$ represents an output data block of the rotating accelerometer gravity gradiometer and $L^+$ represents a generalized inverse of an L matrix; and 2-4) substituting the calibrated linear motion error coefficient vector $C_m$ and angular motion error coefficient vector $C_A$ into the following formula, and removing the linear and angular motion errors of the rotating accelerometer gravity gradiometer;

$$G_{out}^{gra} = G_{out} - [C_m, C_A]L$$

where, $G_{out}^{gra}$ represents the output data block of the rotating accelerometer gravity gradiometer after the linear and angular motion errors are removed, wherein L is the motion matrix of the data block calculated in the step 2-2.

\* \* \* \* \*